United States Patent
Hunter

[19]

[11] Patent Number: 6,126,363
[45] Date of Patent: Oct. 3, 2000

[54] VIBRATORY PLOW WITH IMPROVED BLADE CONFIGURATION

[75] Inventor: Lemna J. Hunter, Corrales, N. Mex.

[73] Assignee: Installation Systems, LLC, Carlsbad, Calif.

[21] Appl. No.: 09/095,665

[22] Filed: Jun. 10, 1998

Related U.S. Application Data

[63] Continuation-in-part of application No. 08/706,785, Sep. 3, 1996, Pat. No. 5,934,833.

[51] Int. Cl.⁷ ....................................... E02F 5/10
[52] U.S. Cl. ............................... 405/182; 37/367
[58] Field of Search ..................... 405/174, 180, 405/182, 181, 183; 37/367, 380, 904

[56] References Cited

U.S. PATENT DOCUMENTS

| | | |
|---|---|---|
| 3,326,009 | 6/1967 | Gagne . |
| 3,326,010 | 6/1967 | Gagne . |
| 3,390,533 | 7/1968 | Gremillion ............................. 405/182 |
| 3,421,329 | 1/1969 | Kinnan . |
| 3,685,591 | 8/1972 | Ulrich, et al. . |
| 3,952,810 | 4/1976 | Ulrich . |
| 4,504,740 | 3/1985 | Carter . |
| 4,685,832 | 8/1987 | Decker . |
| 5,108,229 | 4/1992 | Slanker . |
| 5,144,760 | 9/1992 | McGuire ............................ 405/182 X |
| 5,320,451 | 6/1994 | Garvey et al. .......................... 405/181 |

*Primary Examiner*—David Bagnell
*Assistant Examiner*—Sunil Singh
*Attorney, Agent, or Firm*—Brian J. Pangrle

[57] ABSTRACT

A vibratory plow used for laying pipe or electrical cable in the ground is provided with an improved V-shaped oscillating blade. The V-shaped blade has two blade arms that are not connected at their lower ends, so that each blade is free to move in an oscillatory path in the plane of the blade without interference from and independently of the other blade arm.

15 Claims, 5 Drawing Sheets

VIBRATORY PLOW WITH IMPROVED BLADE CONFIGURATION

CROSS-REFERENCE TO RELATED APPLICATIONS

This application is a continuation-in-part application of Applicant's earlier application entitled "Vibratory Pipe and Cable Laying Plow", U.S. patent application Ser. No. 08/706,785 filed on Sep. 3, 1996, now U.S. Pat. No. 5,934,833.

BACKGROUND OF THE INVENTION

1. Field of the Invention (Technical Field)

The present invention relates to a vibratory plow used for laying pipe and/or electrical cable in the ground.

2. Background Art

Vibratory plows are used to rapidly lay pipe or cable, referred to in this specification as "conduit" below ground at a predetermined depth without the need for first digging a trench into which the conduit is deposited and then covered with the earth that was removed from the trench. Laying conduit underground is used in various power, gas, and telephone utility company applications, but it is also used in the installation of cable TV systems, oil and gas pipelines, and sprinkler systems for industrial, commercial, and residential applications. Particularly in the case of the installation of conduit in residential neighborhoods, it is desirable to operate a vibratory plow that is not of tractor-sized proportions as is typically used in rural areas where conduit must be laid over long distances in rough terrain. A suitable vibratory plow for residential areas is desirably smaller, more maneuverable, and capable of being operated in and among houses, other structures, and trees and other naturally occurring objects without undue harm to such structures and objects.

Many types of vibratory plows are available and have been in use that are more or less directed at the above-identified applications. However, it has been found that most of such prior art vibratory plows are still large, heavy construction equipment that lack the desirable flexibility and maneuverability for laying conduit in confined outdoor environments.

In Applicant's earlier invention as described above, a vibratory plow suitable for the above applications is disclosed, including a plow blade form a "V". The plow machine is shown as a self-propelled vehicle, but it also may be winch-assisted to provide enhanced pulling force when needed for difficult soil conditions or for laying larger conduit. The vibratory plow machine there disclosed includes means for oscillating the V-shaped blade and further the capability of performing the oscillation in a substantially elliptical path or a substantially horizontal path, through manual selection in accordance with the soil conditions. The plow machine included a gasoline engine powering a multi-function hydraulic system, which included powering of the winch, a trans-axle attached to the forward drive wheels that moves the plow machine forward, the above-mentioned oscillating means, a steering wheel, and a hydraulic cylinder operating a blade-extension mechanism that is used to push the V-shaped plow blade into the ground and raise it from the ground upon completion of operations or when an impassible barrier is encountered. The V-shaped plow blade is adapted for laying two parallel conduits, which is desirable in many construction installations. The vibratory plow blade is also capable of adjustment to change the angle of attack.

Notwithstanding the superiority of the above-described earlier invention of Applicant, it has been found that the V-shaped blade configuration used in the described vibratory plow machine is constructed such that the lowest ends or tips of the two blade arms are affixed to a conduit pulling means as shown therein. As a result of the bottom of the V-shaped blade being "closed", i.e., each blade arm attached to the other, there are limitations with respect to the oscillatory paths in which the blade may be operated. As a result of this restriction on the modes of oscillatory movement of the V-shaped plow blade, Applicant has developed an alternative and believed to be more advantageous V-shaped blade configuration.

SUMMARY OF THE INVENTION (DISCLOSURE OF THE INVENTION)

It is therefore an object of the present invention to provide an improved V-shaped plow blade assembly that permits advantageous oscillatory movement of the plow blade to effect superior earth-cutting action.

It is another object of the present invention to provide an improved V-shaped plow blade assembly wherein each blade arm of the "V" is capable of independent movement from the other blade arm.

Yet another object of the present invention is to provide a V-shaped plow blade assembly in which the lower end of each arm of the blade is separated or disconnected from the lower end of the adjoining blade arm so that each blade is capable of independent movement. In summary, the present invention comprises an improved V-shaped plow blade for a vibratory plow machine having each arm of the V-shaped blade separate from the other and capable of independent movement to thereby facilitate forward movement of the machine during the conduit-laying process by mitigating earth resistance to the blade. In one operating mode, only one arm of the V-shaped blade may be used.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODE FOR CARRYING OUT THE INVENTION)

Figure 1:
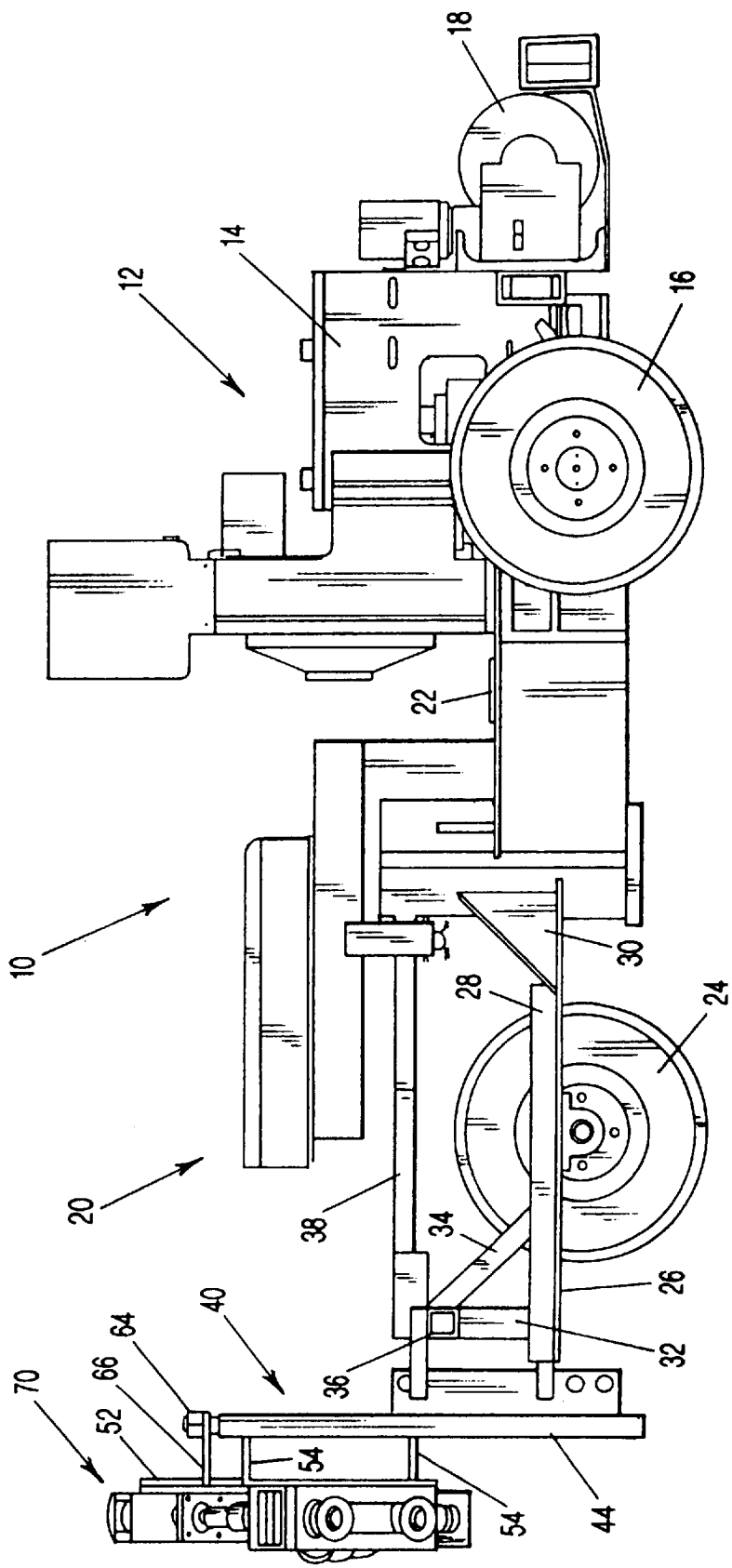
FIG. 1 is a side view of the plow machine including the improved blade assembly.

FIG. 1 shows the entire vibratory plow 10 comprising a forward tractor chassis 12 including an engine 14 for driving wheels 16 through any well-known type of drive transmission mechanism. At the front end of the tractor 12 is a winch 18, which may be used if the driving force of the wheels 16 of the tractor 12 fail to provide traction in certain types of soil conditions, at which point the winch 18 may be extended to some fixed object and hydraulically operated so as to pull the tractor toward the fixed object. The engine 14 powers the hydraulic systems of the machine, as will be described. The tractor 12 is connected to a trailer chassis 20 that is connected to the tractor 12 through a trunnion 22 and is mounted on wheels 24.

Figure 4:
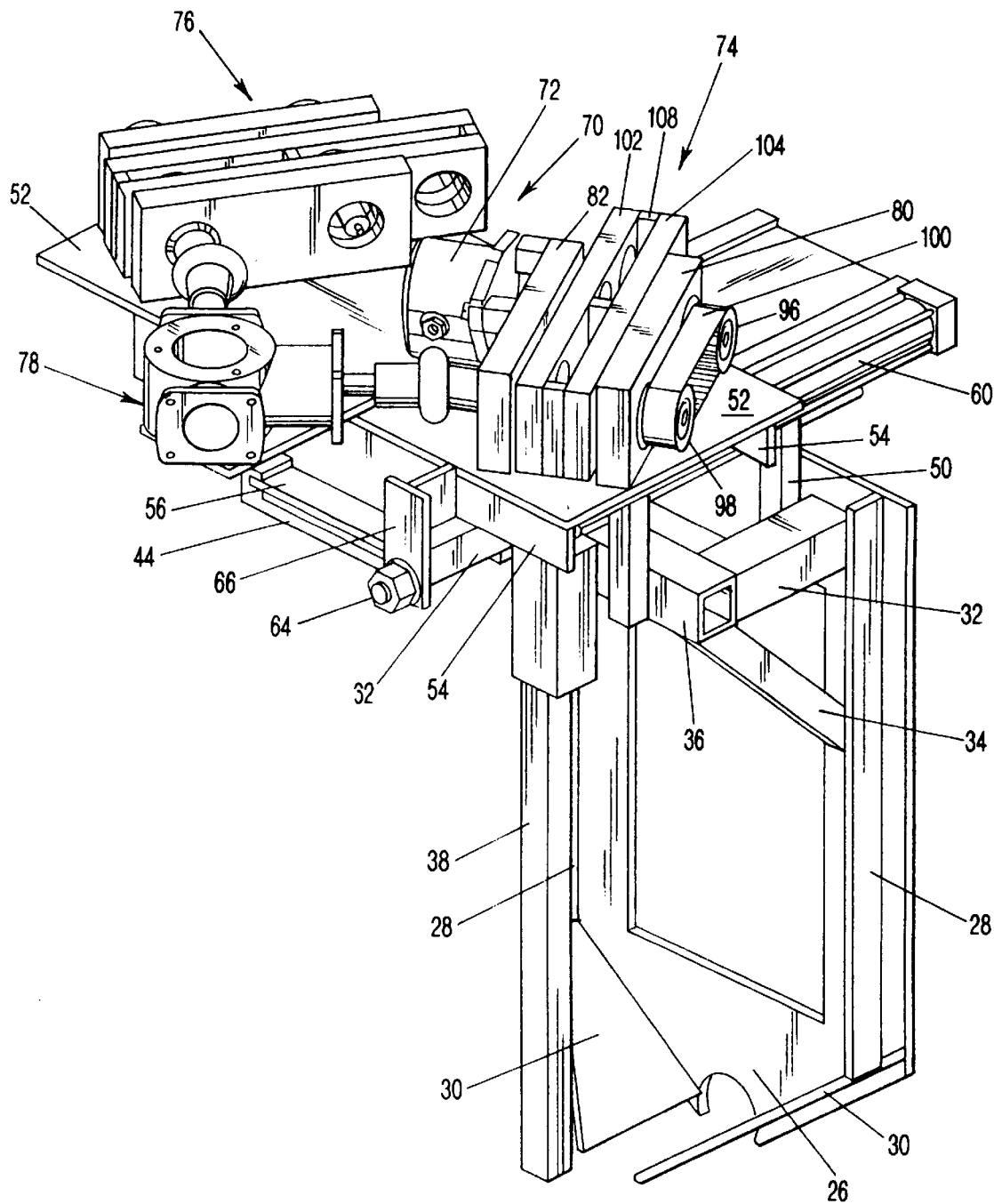
FIG. 4 is a perspective view of the mechanism shown FIGS. 2 and 3.

The trailer chassis 20, as seen best in FIGS. 1 and 4, includes a generally rectangular flat plate or bed 26, including longitudinal strengthening members 28 and diagonal strengthening members 30. At the rearward end of the trailer chassis 20, there is a support structure for blade extension means (to be described) comprising vertical members 32, diagonal support members 34, and horizontal member 36. Horizontal member 36 supports a longitudinal member 38 spaced vertically above the bed 26 of the trailer chassis 20.

Figure 3:
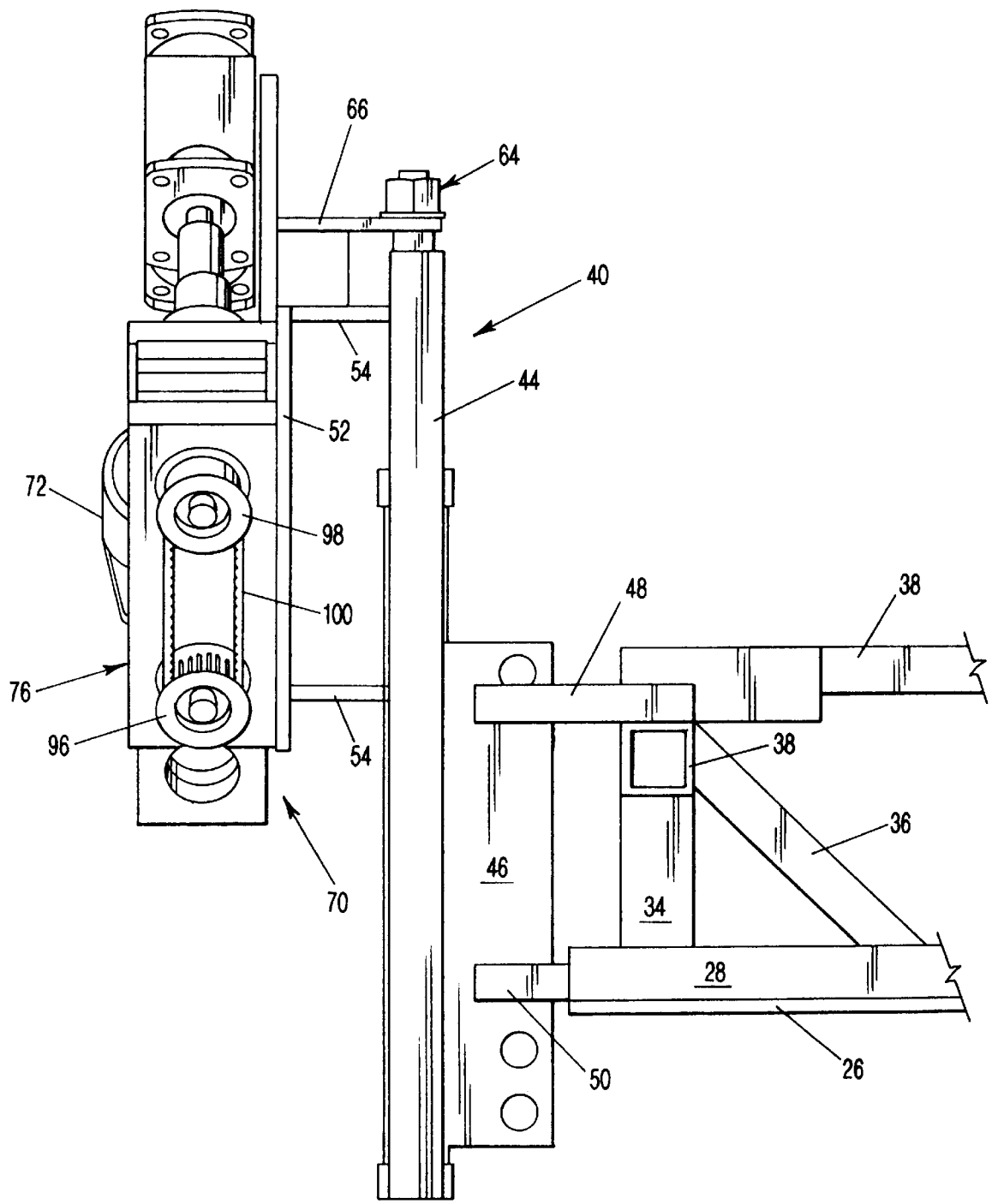
FIG. 3 is a side view of the mechanism shown in FIG. 2.

A blade extension mechanism is mounted to the supporting structure 32, 34, 36, and 38 and is shown generally at 40. The extension means includes a generally rectangular vertical member 44 having a C-shaped cross section, as seen best in FIG. 4. Member 44 is fixedly mounted to the supporting structure 32, 34, 36, and 38 through a support plate 46 adjustably attached to two additional support members 48 and 50, as seen best in FIG. 3. A vertically movable carriage for the blade vibratory mechanism rides in member 44 and comprises mounting plate 52 and horizontal mounting plate member 54, which are secured to a sliding plate 56 inserted into the C-shaped member 44.

The carriage for mounting the vibratory oscillating mechanism is raised and lowered through an hydraulic cylinder mounted parallel to and at one edge of C-shaped member 44, as shown at 60. A piston is mounted within cylinder 60 including an extending piston arm 62, which is attached through a threaded connection 64 to a member 66 that is connected to mounting plate frame member 54. It will be readily appreciated that when the cylinder is hydraulically pressurized, it will drive the piston and the piston arm extension 62 upwardly, thus raising the carriage mechanism supporting the vibratory blade mechanism.

The vibratory blade mechanism is shown generally at 70 and is mounted on mounting plate 52 including mounting plate extension 53. The vibratory blade mechanism 70 comprises an hydraulic motor 72 fixedly mounted to the mounting plate 52. Vibratory blade mechanism 70 also includes two oscillating means shown generally at 74 and 76 and coupling means shown at 78. Hydraulic motor 72 directly drives oscillating means 74, which is coupled through means 78 to driven oscillating means 76. Each of the blade oscillating means 74,76 are identical, other than that oscillator 74 is driven directly by motor 72 and oscillator 76 is driven through the coupling means 78. Accordingly, only one of such blade oscillating means will be described.

Figure 2:
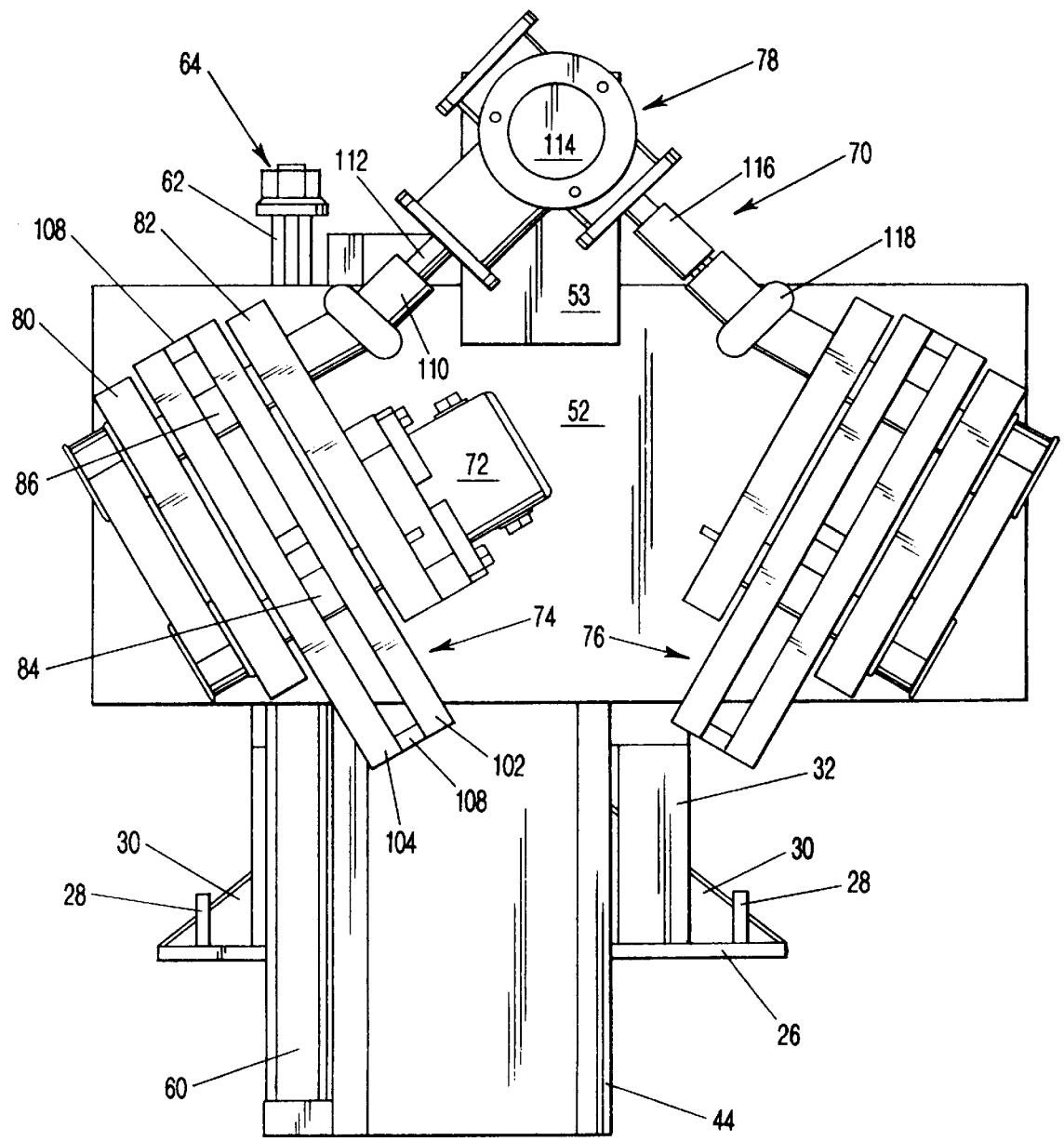
FIG. 2 is a rear view of improved blade assembly oscillating mechanism.
Figure 5:
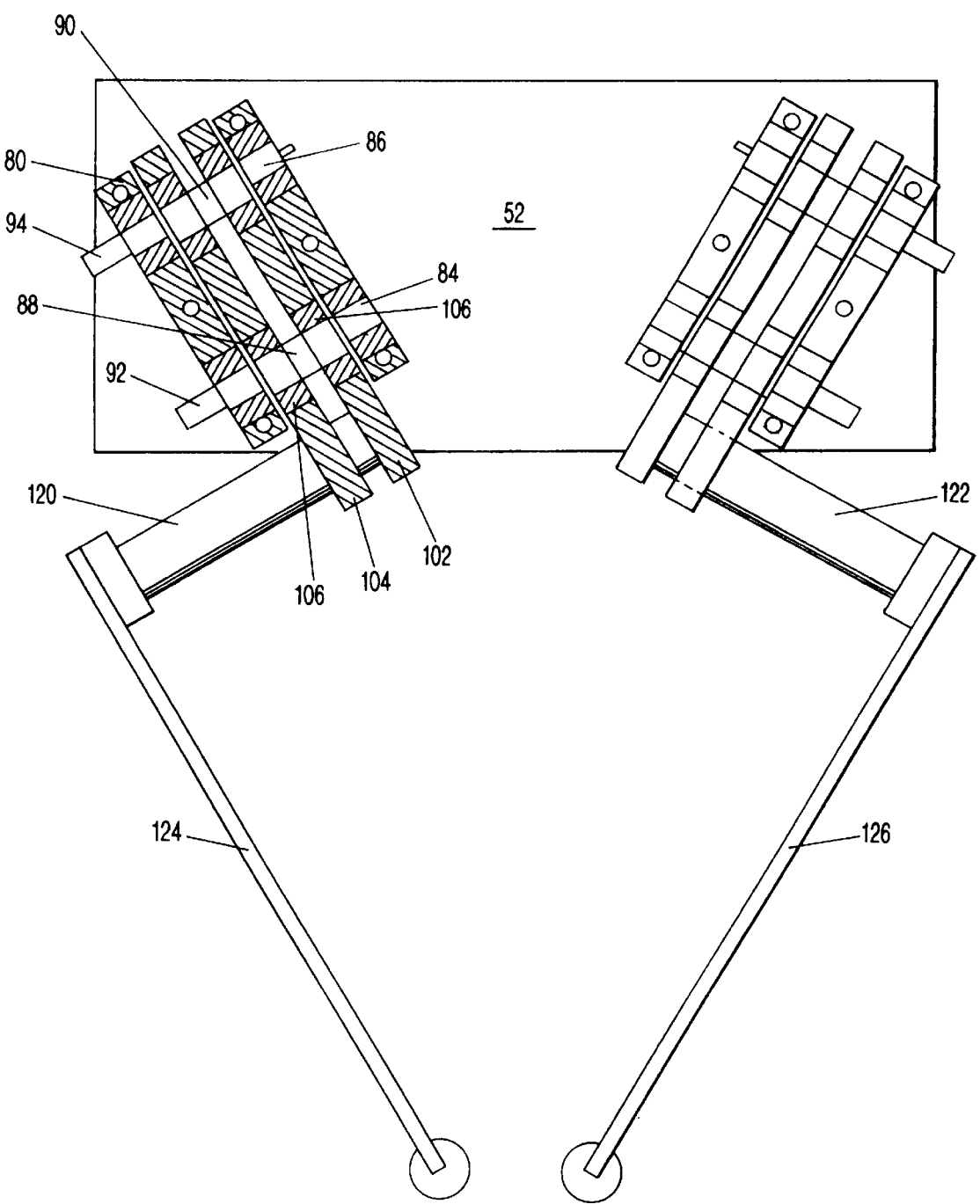
FIG. 5 is a rear view showing the two blade arms mounted on the vibratory blade assembly mechanism.

With particular reference to FIGS. 2 and 4, oscillating means 74 comprises a pair of mounting blocks 80, 82, each of which has mounted therein heavy duty bearings to support a pair of shafts 84, 86. Each shaft has an eccentric portion 88,90 integral with shafts 84, 86 respectively. Each of the shafts 84, 86 have an outboard extension 92,94 as seen in FIG. 5, on which are mounted gears or cogs 96,98, as seen best in FIGS. 3 and 4, which are connected through a flexible drive belt 100, thus positively interconnecting shaft 84, which is driven by motor 72, to shaft 86, which transmits the power to coupling means 78. Mounted on the eccentric portions 88, 90 of the shaft are oscillating members 102, 104 including bearings 106 and which are interconnected by spacers 108.

As seen best in FIGS. 2 and 4, shaft 86 is attached through a universal joint 110 a stub shaft 112 into a right-angle gear-coupling assembly 114 through an additional stub shaft 116 through a second universal joint 118 to a shaft on the second blade oscillating means 76, which as noted above is identical to assembly 74. It will therefore be understood that operation of hydraulic motor 72 so as to rotate shaft 84 through the positive drive connection comprising the cogs or gears 96,98 and the interconnecting belt 100 will drive shaft 86, thereby producing an oscillating motion of the blade oscillating means comprising members 102, 104, and 108. Furthermore, driven shaft 86 through the coupling means 78 will produce an identical oscillating motion, except in a different plane, of blade oscillating means 76.

At the lower end of blade oscillating means 74 and 76, as seen best in FIG. 5, there are mounted tubes 120,122, at the outboard end of which are mounted the vibratory blade arms 124 and 126. Since tubes 120,122 will oscillate together with the blade oscillating means comprising members 102, 104, and 108, blade arms 124 and 126 will oscillate in a plane defined by the blade length and width so that the forward edge of the blade will cut through the soil. Various types of conduit connecting mechanism may be used at the lower tip of one or both of the blades to permit the pulling in of one conduit or two conduits simultaneously.

It will now be appreciated that as the machine 10 is drawn forward through the tractor 12 which pulls the chassis 20, the blade arm 124 and 126 will be pulled forward, cutting through the soil while simultaneously being oscillated in the plane of the blade arms and pulling in the conduit below the surface of the soil. It will also be appreciated that since the blade assembly has a generally V-shaped orientation, that a V-shaped cross-section of the soil is being parted from the remainder of the soil, forming an extended V-shaped clod of soil. Thus, when the entire length of cable is laid, it is relatively simple to remove the V-shaped clod of soil, thus providing access to the end of the cable. The new cable can then be attached to the pulling mechanism of the vibratory blade arms 124 and 126 and the next reel of cable may be pulled in. When that second length of cable is pulled in, the two free ends of the cable at the location where the clod of earth has been removed may then be spliced or coupled or otherwise interconnected. The clod of earth may then be reinserted into the trough-like opening, and thus there is nearly no disruption of the soil surface either along the length of the cable run or even where the two cables are joined. Such free access to the ends of the two cables to be joined is obviously very efficient, permitting rapid laying as well as joining of the extended conduit system.

It will be also apparent that because the two blades oscillate in the plane of the blades, the oscillatory cutting motion of the front edge of the blades is more efficient than the irregular oscillatory motion of the original plow blades as disclosed in the parent application. Thus, all of the advantages mentioned above may be realized through the new blade oscillating mechanism.

In certain conditions it may not be necessary to use both arms of the V-shaped blade assembly. By using a single arm, there is less resistance to movement of the underground arm and thus less power is required and/or faster movement of the vehicle may be achieved.

It will also be obvious to those having ordinary skill in the art that other mechanisms for implementing the vibratory motion of the separately mounted blades may be employed without departing from the scope of the invention as defined in the appended claims.

What is claimed is:

1. A plow blade assembly for use in a movable plow machine for laying conduit underground, the machine including a source of power for vibrating the plow blade assembly and for driving the machine forward along the direction of the conduit, said plow blade assembly comprising:

two underground blade arms, disposed in a V-shaped configuration wherein the V-shaped configuration comprises an open bottom allowing for independent movement of said arms;

means for oscillating each of said blade arms in the plane of the blade arm; and means for transmitting power from the source to said oscillating means.

2. The plow blade assembly of claim 1 wherein each of said blade arms have an elongated cross-section with one end of said section forming a sharp edge.

3. The plow blade assembly of claim 1 wherein at least one of said blade arms includes means for pulling said conduit supported at the lower end of said at least one blade arm.

4. A powered movable plow machine for laying underground conduit comprising:

a chassis with wheels;

an engine for driving said wheels;

a hydraulic system powered by said engine;

underground vibratory blade means;

a vertically movable carriage supporting said oscillating means and vibratory blade means;

said vibratory blade means comprising two blade arms arranged in a V-shaped configuration wherein the V-shaped configuration comprises an open bottom allowing for independent movement of said arms.

5. The machine of claim 4 additionally including hydraulic piston means attached to said carriage for raising and lowering said vibratory blade means.

6. The machine of claim 4 wherein each of said blade arms have a longitudinal edge for cutting through the earth as the machine moves forward.

7. The machine of claim 4 wherein at least one of said blade arms includes means for pulling said conduit supported at the lower end of said at least one blade arm.

8. The machine of claim 4 wherein each of said blade arms are oscillated in the plane of its respective blade arm.

9. A plow blade assembly for use in a movable plow machine movable over the ground for laying conduit underground, said machine including a source of power for vibrating the plow blade assembly and for driving the machine forward along the direction of the conduit, said plow blade assembly comprising:

(a) a first underground blade arm, including a free end oriented in a direction diagonal to the surface of the earth;

(b) a second underground blade arm, including a free end oriented in a direction diagonal to the surface of the earth, opposite to the direction of the first blade arm;

(c) means for oscillating said first and second blade arms, each in the plane of is blade arm; and (c) means for transmitting power from the source to said oscillating means.

10. The plow blade assembly of claim 9 wherein said first and second blade arms each have an elongated cross-section with one end of said section forming a sharp edge.

11. The plow blade assembly of claim 10 wherein said means for oscillating said first and second blade arms comprises a first oscillating means for oscillating said first blade arm and a second blade oscillating means for said second blade arm.

12. The plow blade assembly of claim 11 wherein said first and second oscillating means are mechanically coupled.

13. The plow blade assembly of claim 12 wherein each of said individual blade arm oscillating means comprises:

a pair of mounting blocks, a pair of shafts mounted in said blocks for rotation;

one of said shafts being connected to said power source for rotating said shaft and the other shaft being coupled to said one shaft for rotation therewith;

an eccentric mounted on each of said shafts; and two oscillating members, each one of said oscillating members mounted on the eccentric portion of each of said shafts, each one of said oscillating members connected to one of said blade arms.

14. The plow blade assembly of claim 9 wherein the free end of each of said blade arms are capable of independent movement.

15. The plow blade assembly of claim 9 wherein at least one of said blade arms includes means for pulling conduit supported at the lower end of said at least one blade arm.

* * * * *